Patented Feb. 18, 1947

2,416,265

UNITED STATES PATENT OFFICE 2,416,265

AMINO ETHERS AND METHOD OF PREPARING SAME

Clinton W. MacMullen and Herman A. Bruson, Philadelphia, Pa., assignors to Röhm & Haas Company, Philadelphia, Pa., a corporation of Delaware No Drawing. Application October 9, 1943,
Serial No. 505,663

8 Claims. (Cl. 260—567.6)

This invention relates to aryl aliphatic ethers which contain an aromatic nucleus substituted by an aminomethyl group and to a process for preparing such ethers. More particularly this invention relates to ethers of the formula $$(ZCH_2)_n ArXAY$$

wherein Z is a secondary amine group, a tertiary amine group, or a quaternary ammonium group, $n$ is an integer having a value of one or two, Ar is a carbocyclic aromatic nucleus, X is oxygen or sulfur, A is an alkylene group, the chain of which may be interrupted by oxygen or sulfur, and Y is a polar group based upon the elements carbon, hydrogen, halogens, oxygen, and nitrogen, including such groups as —OH, —O-alkyl, —O-aryl, —CO-alkyl, —CO-aryl, —OCO-alkyl, —OCO-aryl, —COOH, —COO-alkyl, —CONHR', —CONHR'', —halogen, —NR'R'', or —NR'R''R''' anion, R'—R''' representing hydrogen or aliphatic, cycloaliphatic, arylaliphatic, heterocyclic, or aryl groups.

The aminomethyl ethers of this invention may be prepared by reacting an amine with an aryl aliphatic ether having a nuclear halomethyl substituent of the formula (halogen $CH_2)_n ArXAY$ in the presence of a strong base, such as sodium hydroxide, potassium hydroxide, benzyl trimethyl ammonium hydroxide, barium hydroxide, calcium hydroxide, etc.

As a halomethyl ether there may be used any of the ethers described in United States Patents Nos. 2,291,526, 2,291,527, and 2,291,528, issued July 28, 1942, and in United States Patent No. 2,266,737, issued December 23, 1941.

Typical halomethyl aryl aliphatic ethers which are suitable as starting materials include such compounds as the following:

$(ClCH_2)_n ArOCH_2CH_2OH$. where $n$ has a value of one or two
$BrCH_2C_6H_4OCH_2CH_2OCH_3$
$BrCH_2C_6H_4OCH_2CH_2OC_6H_5$
$BrCH_2C_6H_4OCH_2CH_2OC_6H_4CH_2Br$
$(ClCH_2)_2C_6H_4SCH_2CH_2OC_2H_5$
$ClCH_2C_6H_4OCH_2CH_2SC_6H_5$
$ClCH_2C_6H_4OCH_2CH_2OCH_2CH_2OC_2H_5$
$(HalCH_2)_n Ar(OCH_2CH_2)_m O$-alkyl, where $m$ is an integer from one to ten or more, and the alkyl group contains from one to eighteen carbon atoms
$(ClCH_2)_n ArOCH_2CH_2CO$-alkyl
$ClCH_2C_6H_4OCH_2COC_4H_9$
$ClCH_2C_6H_4OCH_2COC_6H_5$
$ClCH_2C_6H_4O(CH_2)_m COR'$ 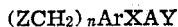
$ClCH_2C_6H_4OC_2H_4OC_2H_4COR'$
$ClCH_2C_6H_4OCH_2CH_2OCH_2CH_2OCOR$
$ClCH_2C_6H_4OCH_2CH_2OCOC_3H_7$
$ClCH_2C_6H_4OCH_2CH_2OCO$-aryl
$ClCH_2C_6H_4OCH_2CH_2OCOC_6H_5$
$(ClCH_2)_n ArOCH_2COO$-alkyl $(ClCH_2)_n ArOCH_2CH_2COO$-alkyl
$(ClCH_2)_n ArOCH_2CH_2Cl$
$BrCH_2C_6H_4OCH_2CH_2Br$
$ClCH_2C_6H_4OCH_2CH_2OCH_2CH_2Br$
$ClCH_2C_6H_4SCH_2CH_2Cl$
$ClCH_2C_6H_4OCH_2CH_2OC_6H_4CH_2Cl$
$ClCH_2C_6H_4OCH_2CH_2SAr$
$ClCH_2C_6H_4OCH_2CH_2OCH_2Cl$
$(ClCH_2)_n ArOC_3H_6OC_3H_6Cl$
$BrCH_2C_6H_4OCH_2CH_2SCH_2CH_2Br$
$(ClCH_2)_n ArOCH_2CH(CH_3)OCH(CH_3)CH_2Cl$
$ClCH_2C_6H_4OC_4H_8Cl$
$(ClCH_2)_n C_6H_{5-n}(OC_2H_4)_m OC_2H_4Cl$
$(ClCH_2)_2C_6H_2(CH_3)OCH_2CH_2Cl$
$(BrCH_2)_2C_6H_2(C_8H_{17})OC_2H_4OC_2H_4Cl$
$(ClCH_2)_2C_6H_2(C_4H_9)OC_3H_6OC_3H_6Cl$
$(ClCH_2)_n C_6H_{4-n}(C_{18}H_{37})OCH_2CH_2Cl$
$(ClCH_2)_n C_6H_{4-n}(CH_3)OCH_2CH_2OC_6H_{4-n}$
$(CH_3)(CH_2Cl)_n$
$(ClCH_2)_2C_6H_3OC_2H_4OC_2H_4OC_2H_4Cl$
$(ClCH_2)_2C_6H_3OCH_2COOC_{12}H_{25}$ In the above compounds the aromatic nucleus, designated Ar in generic terms and shown specifically as the phenyl group, may contain nuclear substituents such as alkyl, cycloalkyl, aryl, nitro, halogen, acyl, or other group which is stable under the conditions used in the preparation of the halomethyl ethers, that is, in the presence of a hydrogen halide and formaldehyde. This requirement excludes phenolic hydroxyl, amino, diazo, and aldehyde groups. The aromatic nucleus may be mononuclear or polynuclear, as in benzene, naphthalene, phenanthrene, anthracene, diphenyl, etc.

As reactant with one of the above halomethyl aryl aliphatic ethers there is used a primary, secondary, or tertiary amine to yield secondary or tertiary amines, or a quaternary ammonium salt. A product in the form of a tertiary amine may be converted by reaction with an alkylating or aralkylating agent into a quaternary ammonium salt. The reacting amines may be members of the aliphatic, arylaliphatic, cycloaliphatic, or aryl series or may contain substituents from two or more of these series. Typical amines include methylamine, ethylamine, isopropylamine, butylamine, amylamine, octylamine, isooctylamine, caprylamine, decylamine, dodecylamine, octadecenylamine, octadecylamine, allylamine, methallylamine, hydroxyethylamine, hydroxypropylamine, benzylamine, methylbenzylamine, aniline, chloroaniline, cyclohexylamine, methylcyclohexylamine, dimethylamine, diethylamine, dibutylamine, diethanolamine, diallylamine, dimethallylamine, diisooctylamine, dodecylmethylamine, octadecylmethylamine, methyl benzylamine, dicyclohexylamine, methylaminobenzene, cyclic amines such as morpholine, piperidine, pyrrolidine, etc. In fact, any primary or secondary monoamine appears to be useful in forming the aminomethyl aryl aliphatic ethers of this invention. Primary and secondary amines are characterized by the presence of a hydrogen atom attached to the amino nitrogen atom thereof. It will be noted that, in the cases of such amines as morpholine and pyridine, the groups attached to the nitrogen are di- or tri-valent groups which form heterocycles with the nitrogen.

The reaction between halomethyl arylaliphatic ether and amine is carried out by reacting said ether with an amine in the presence of a base at a temperature between about —20° C. and about 250° C. If desired, the reaction may be performed in the presence of a solvent, such as dioxane, toluene, water, or the like. When several types of labile halogens are present in the ether, the reaction may be so conducted as to replace only one type or so as to replace all of the halogens. If the reaction is carried out above about 100° C., the various labile halogens are replaced by amine groups. Between —20° C., and about 100° C., however, only the halogen of the halomethyl groups reacts. In a similar way the reaction product may be varied in the case of the ethers having —COOH, or —COOR, or —OCOR groups by variations in temperatures of reaction. Thus, in the lower range amines react only with the halogen of the halomethyl group, whereas in the upper temperature range there occurs not only the reaction with the halomethyl group but also reaction with the carboxyl group leading to mono- or di-substituted carboxylic amides and to alcohols.

Because of the difference in reactivity of the different types of labile halogens, they may be replaced with one type of amino nitrogen group or with different such groups. Thus, the compound R'R''NCH2ArXC2H4Cl may be formed below 100° C. and this reacted above 100° C. to form R'R''NCH2ArXC2H4NR'''R''''.

Tertiary amines prepared by reaction of halomethyl ether and secondary amine may be converted to the corresponding quaternary ammonium salt by reaction with such compounds as the dialkyl sulfates, as, for example, diethyl sulfate, alkyl halides as, for example, methyl iodide, bromide, or chloride, benzyl halides, esters, as, for example, methyl formate, ethyl chloro-acetate, or methyl-p-toluene sulfonate, alkyl halomethyl ethers as, for example, bromomethoxybutane, or a halomethyl aryl ether, such as chloromethyl phenoxyethyl chloride, etc.

When a salt of an amine is desired, it may be formed by the addition of an acid to an amine. Salts of both inorganic and organic acids may be prepared.

The amino ethers of this invention may be used as textile finishing agents, disinfectants, bactericides, wetting agents, detergents, insecticidal preparations, drugs, fungicides, etc.

The invention is illustrated by the following examples.

*Example 1*

73 grams of diethylamine was added to a cold solution of 40 grams of sodium hydroxide in 120 grams of water. To this cold mixture was added with stirring 70 grams of chloromethyl o-cresoxy ethoxy ethyl chloride at —6° to —11° C. The milky viscous mixture was stirred 25 hours during which the temperature rose to 27° C. The lower aqueous layer was discarded, and the oil taken up in benzene and washed twice with water. The crude amine was converted to its hydrochloride with hydrochloric acid, and the aqueous mixture steam-distilled to remove insoluble impurities. The residue stood a few days, and the slightly turbid aqueous solution was decanted from a few grams of heavy insoluble oil, and clarified by agitation with an adsorbent clay. The clear amber filtrate was neutralized with sodium hydroxide solution, and the free amine liberated was taken up in benzene and washed. The solvent was distilled off in vacuo, and the residual oil clarified by stirring with 2.5 grams of activated charcoal. The 42 grams of yellow oil obtained after filtration corresponded in composition to diethylaminomethyl o-cresoxy ethoxy ethyl chloride having the formula

A quaternary ammonium salt was prepared by refluxing 10 grams of the diethylaminomethyl o-cresoxy ethoxy ethyl chloride with 11 grams of ethyl bromide for one hour at 54° C. The excess ethyl bromide was then distilled out, leaving a viscous paste which did not crystallize when cooled. The (beta - chloroethoxy - ethoxy) - methyl-benzyl triethyl ammonium bromide had the following formula:

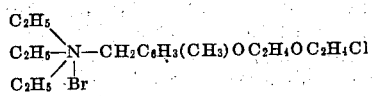

Another quaternary ammonium derivative was prepared by warming 10 grams of the diethylaminomethyl o-cresoxy ethoxy ethyl chloride with 5 grams of benzyl chloride for eight hours at 70° C. The (beta-chloroethoxy-ethoxy)-methyl-benzyl diethyl benzyl ammonium chloride was a viscous orange oil having the formula:

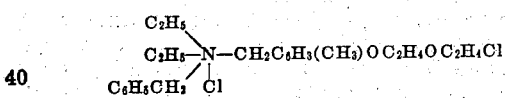

A quaternary ammonium salt was prepared by heating 6 grams of the diethylaminomethyl o-cresoxy ethoxy ethyl chloride with 4 grams of decyl chloromethyl ether for four and a half hours at 90° C. The viscous red paste obtained was soluble in water with suds, and the product had the formula:

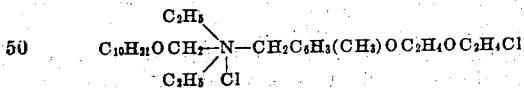

*Example 2*

A mixture of 156 grams of p-tert-octyl phenoxy ethoxy ethyl chloride, 30 grams of paraformaldehyde, and 200 grams of ethylene dichloride was stirred and saturated with gaseous hydrogen chloride for seven hours at 50–53° C. The reaction mixture was washed with ice water, dried with anhydrous sodium sulfate, filtered, and the solvent distilled off in vacuo leaving 140 grams of clear amber oil.

This was crude chloromethyl p-tert-octyl phenoxy ethoxy ethyl chloride which was added during 35 minutes to a mixture of 360 grams of 25% dimethylamine solution and 80 grams of sodium hydroxide at 3–5° C., and the mixture stirred nine hours at 5–18° C. The oil layer was converted to the soluble amine hydrochloride with hydrochloric acid, and the aqueous solution steam-distilled to remove non-soluble impurities. The residual viscous, amber, clear solution was neutralized with sodium hydroxide to liberate the amine which was taken up in benzene, washed twice with water, dried with anhydrous sodium sulfate, filtered, and the solvent distilled off in vacuo. The dimethylaminomethyl p-tert-octyl phenoxy ethoxy ethyl chloride was obtained as a clear amber, viscous oil, having the formula:

A quaternary ammonium salt was prepared by heating 7.5 grams of dimethylaminomethyl p-tert-octyl phenoxy ethoxy ethyl chloride with 3 grams of methallyl chloride at 90° C. for 5 hours. The (beta-chloroethoxy-ethoxy)-p-tert-octyl-benzyl dimethyl methallyl ammonium chloride was obtained as a clear yellow viscous oil, soluble in water with suds, having the formula:

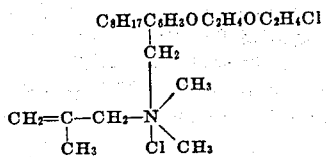

*Example 3*

44 grams of morpholine was mixed with a solution of 20 grams of sodium hydroxide in 40 grams of water, and to this cold mixture was added with stirring 118 grams of chloromethyl p-tert-octyl phenoxy ethoxy ethyl chloride during 30 minutes at 55–70° C. The turbid brown mixture was stirred five and a half hours at 70–60° C. To the cooled reaction mixture was added 80 cc. of concentrated hydrochloric acid and 200 cc. of water, and the mixture steam-distilled to remove insoluble impurities. The residue was diluted with water and clarified by stirring twice with 10 and 20 grams of activated charcoal, respectively. The aqueous solution was filtered, and neutralized to liberate the amine.

The amine was taken up in benzene and washed three times with water. The benzene was distilled off in vacuo leaving 93 grams of viscous amber oil, consisting of morpholinomethyl p-tert-octyl phenoxy ethoxy ethyl chloride which had the formula:

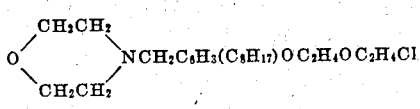

A quaternary ammonium salt was prepared by mixing 8 grams of morpholinomethyl p-tert-octyl phenoxy ethoxy ethyl chloride with 4 grams of decyl chloromethyl ether at 15° C., and stirring for ten minutes at 30–40° C. A very viscous, clear, amber oil was obtained, soluble in water with suds. The aqueous solution was purified by steam distillation and by agitation with an adsorbent clay. (Beta-chloroethoxy-ethoxy)-(p-tert-octyl)-benzyl decyloxymethyl morpholinium chloride had the following formula:

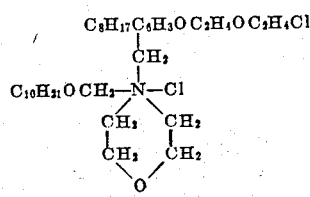

Another quaternary ammonium derivative was prepared by heating 8 grams of morpholinomethyl p-tert-octyl phenoxy ethoxy ethyl chloride with 2.5 grams of ethyl chloroacetate at 100–200° C. for four hours. The viscous oil was extracted with hot water, and the aqueous solution clarified with adsorbent clay and activated silica. The clear, amber, aqueous solution contained (beta-chloroethoxy ethoxy)-(p-tert-octyl)-benzyl' carbethoxymethyl morpholinium chloride:

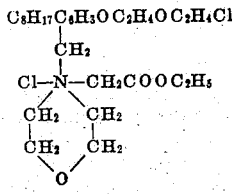

A quaternary ammonium salt was prepared by heating 8 grams of morpholinomethyl p-tert-octyl phenoxy ethoxy ethyl chloride with 3.5 grams of nitrobenzyl chloride at 140–185° C. for four hours. (Beta-chloroethoxyethoxy)-(p-tert-octyl)-benzyl nitrobenzyl morpholinium chloride was a viscous dark oil, soluble in water with suds.

*Example 4*

99 grams of chloromethyl p-tert-octyl phenoxy ethoxy ethyl chloride at 31°–40° C. was added during 17 minutes to a cold mixture of 50 grams of dicyclohexylamine, 11 grams af water, and 11 grams of sodium hydroxide. The mixture was stirred seven hours at 79–95° C., washed with water, and clarified by agitation with 15 grams of active charcoal. The viscous yellow oil was dicyclohexylaminomethyl p-tert-octyl phenoxy ethoxy ethyl chloride, having the formula:

A quaternary ammonium salt was prepared by heating 10 grams of dicyclohexylaminomethyl p-tert-octyl phenoxy ethoxy ethyl chloride with 3 grams of ethyl chloroacetate for five hours at 140–180° C. The (beta-chloroethoxy-ethoxy)-(p-tert-octyl) benzyl dicyclohexyl carbethoxymethyl ammonium chloride was obtained as a yellow paste, having the formula:

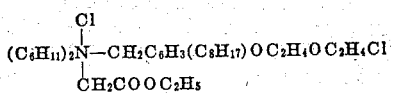

*Example 5*

A mixture of 145 grams of dimethylaminomethyl p-tert-octyl phenoxy ethoxy ethyl chloride (prepared as in Example 2), 180 grams of 25% dimethylamine, 1000 grams of water, and 20 grams of sodium hydroxide was stirred and heated in an autoclave for 6.5 hours at 95–159° C. (at 15–90 lbs. gauge pressure). The reaction mixture cooled overnight, and the oil layer was separated, washed with water, and distilled in vacuo. The clear yellow oil, boiling at 170–190° C. at 1 mm. pressure, was dimethylaminomethyl p-tert-octyl phenoxy ethoxy ethyl dimethylamine, having the formula:

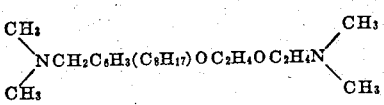

A quaternary ammonium salt was prepared by mixing 8 grams of dimethylaminomethyl p-tert-octyl phenoxy ethoxy ethyl dimethylamine with 5.6 grams of methyl iodide. An exothermic reaction took place, and the mixture was cooled. The solid mass was recrystallized from ethylene dichloride and petroleum ether (90–100° C.). The dimethylaminomethyl p-tert-octyl phenoxy ethoxy ethyl dimethylamine di-methiodide was obtained as a colorless crystalline solid, soluble in water, and having the formula:

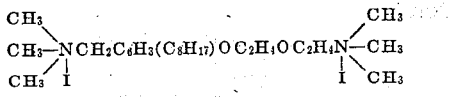

A quaternary ammonium salt was also prepared by mixing 8 grams of dimethylaminomethyl p-tert-octyl phenoxy ethoxy ethyl dimethylamine with 6 grams of diethyl sulfate. An exothermic reaction occurred yielding a viscous paste when cooled, which was clearly soluble in water with suds. The di-quaternary salt had the following formula:

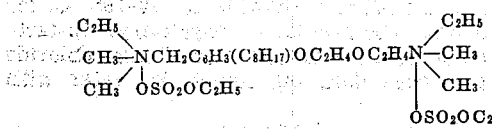

Example 6

360 grams of 25% dimethylamine solution was added to 32 grams of di-(chloromethyl) phenoxy ethyl chloride and the mixture stirred and heated 14 hours at 41–69° C. A solution of 12 grams of sodium hydroxide in 120 cc. of water was added, and the mixture stirred for five hours. The mixture was filtered, and the filtrate extracted four times with benzene. The benzene was distilled off and the residual oil distilled in vacuo. The yellow oil boiling at 110–140° C./1 mm. was di-(dimethylaminomethyl) phenoxy ethylene, having the formula:

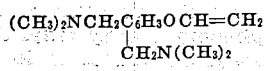

Example 7

60 grams of di-(chloromethyl) phenoxy ethoxy ethyl chloride was added to a cold mixture of 48 grams of water, 16 grams of sodium hydroxide, and 35 grams of morpholine at 25–45° C. and the mixture stirred six hours at 95° C. The oil layer was separated, washed, taken up in benzene and dried, and the benzene distilled off in vacuo. The clear amber oil obtained was di-(morpholinomethyl) phenoxy ethoxy ethyl chloride having the formula:

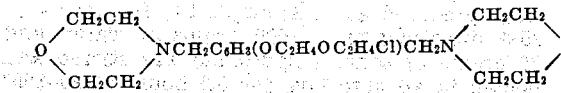

A quaternary ammonium derivative was prepared by stirring a mixture of 40 grams of di-(morpholinomethyl) phenoxy ethoxy ethyl chloride, 22 grams of benzyl chloride, and 125 grams of toluene at 80–90° C. for four hours. The reaction mixture was concentrated, and steam-distilled to remove water-insoluble impurities. A small amount of heavy brown oil layer was separated off on standing, and the quaternary ammonium salt was obtained as a clear aqueous solution.

A quaternary ammonium salt was prepared by warming 4 grams of di-(morpholinomethyl) phenoxy ethoxy ethyl chloride with 2 grams of chloromethyl o-cresoxy ethyl chloride,

at 95° C. for three hours. The mixture became very viscous and, when the mixture was cooled, the quaternary ammonium salt was obtained as a solid which was soluble in water.

Example 8

180 grams of chloromethyl phenoxy ethyl acetate, $ClCH_2C_6H_4OC_2H_4OCOCH_3$, (containing also some di-chloromethyl phenoxy ethyl acetate), 1080 grams of 25% dimethyl amine, 100 grams of water, and 80 grams of sodium hydroxide were stirred in an autoclave and heated five hours at 135–165° C. The mixture cooled overnight, and the viscous sticky oil was separated from the aqueous layer with the aid of benzene. The solvent was distilled off and the residual oil distilled in vacuo. The amino ether alcohol, formed by substitution of the halogen and ammonolysis of the ester groups, was obtained as a viscous oil, boiling at 133–165°C./1–2 mm. The product was a mixture of dimethylaminomethyl phenoxy ethanol

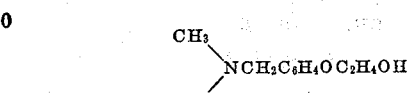

and di-(dimethylaminomethyl) phenoxy ethanol

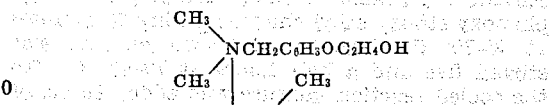

Example 9

A mixture of 69 grams of phenyl hydroxyethyl ether, $C_6H_5OC_2H_4OH$, 60 grams of paraformaldehyde, and 200 cc. of petroleum ether was stirred and saturated with hydrogen chloride for six hours at 30–40° C. The crude oil was washed with water, dried with anhydrous sodium sulfate, filtered, and the solvent distilled off under reduced pressure.

96 grams of the chloromethyl derivative thus obtained was added to a cold mixture of 540 grams of 25% dimethylamine solution and 120 grams of sodium hydroxide during 20 minutes at 4–20° C., and the mixture stirred 23 hours at 20–30° C. The oil was separated, taken up in benzene, washed with water, dried with anhydrous sodium sulfate, and distilled in vacuo. The dimethylaminomethyl derivative of phenoxy ethanol was obtained as a clear, pale yellow oil, boiling at 140–160° C./2 mm. The product was a mixture of the mono- and di-dimethylaminomethyl derivatives having the formulas:

and

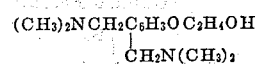

A quaternary ammonium salt was prepared by heating four grams of the dimethylaminomethyl derivative of phenoxy ethanol obtained above and three grams of n-hexyl bromide for a half-hour at 95° C. The hot viscous reaction mixture was cooled to a sticky solid, which was soluble in water.

Example 10

A mixture of 62 grams of phenoxy acetone, 81 grams of 37% formaldehyde, and 300 grams of dioxane was stirred and saturated with hydrogen chloride for seven and one-half hours at 10–30° C. The clear dark brown solution was poured into a large volume of ice water, the oil extracted with benzene, washed, and dried.

The benzene solution of di-(chloromethyl) phenoxy acetone, containing also some chloromethylphenoxy acetone, was added to a cold mixture of 180 grams of 25% dimethylamine solution and 40 grams of sodium hydroxide at 10–20° C., and the heterogeneous brown mixture stirred 15 hours at 20–30° C. The benzene layer was distilled in vacuo, and the dimethylamino methyl derivative was obtained as a clear yellow oil boiling at 120–155° C./2 mm., sparingly soluble in water, but clearly soluble in dilute hydrochloric acid. The product was di-(dimethylaminomethyl) phenoxy acetone

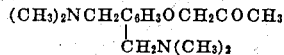

containing also some dimethylaminomethyl phenoxy acetone (CH₃)₂NCH₂C₆H₄OCH₂COCH₃

Quaternary ammonium salts may be formed therefrom as in the previous example.

Example 11

A mixture of 138 grams of phenyl hydroxyethyl ether, C₆H₅OC₂H₄OH, 120 grams of paraformaldehyde, and 300 grams of dioxane was stirred and saturated with hydrogen chloride for 15 hours at 50–60° C. and 4 hours at 10–20° C. The reaction mixture was poured into 1 liter of ice water, the oil layer separated and taken up in 300 cc. of benzene, dried with anhydrous sodium sulfate and filtered. Half of the benzene solution was stripped in vacuo to give a clear amber oil which was di-chloromethyl phenoxy ethanol, containing also some chloromethyl phenoxy ethanol.

245 grams of the benzene solution of the chloromethyl derivative thus obtained was added to a cold mixture of 540 grams of 25% dimethylamine solution and 120 grams of sodium hydroxide during 15 minutes at 0–10° C. and the turbid milky solution stirred 25 hours at 10–20° C. The oil layer was separated, taken up in benzene, washed with water, dried, and distilled in vacuo. A clear, colorless oil was obtained, boiling at 150–170° C./2 mm., which was di-dimethylaminomethyl phenoxy ethanol, containing also some dimethylaminomethyl phenoxy ethanol.

Example 12

42 grams of butyl chloromethyl-phenoxy-acetate, ClCH₂C₆H₄OCH₂COOC₄H₉ (containing also some butyl dichloromethyl - phenoxy - acetate), was mixed with 87 grams of morpholine with the evolution of considerable heat. The mixture stood several days, and was then heated under reflux at 117–130° C. for four hours. The reaction mixture was steam-distilled one hour, neutralized with dilute sodium hydroxide solution, and the product extracted with benzene. The solvent was distilled off and the oil distilled in vacuo. A viscous deep yellow oil was obtained, boiling at 237–275° C./1 mm., which was morpholinomethyl-phenoxy acetyl morpholine:

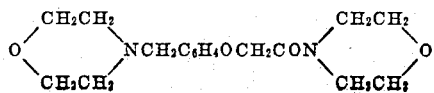

containing also some di-morpholinomethyl-phenoxy acetyl morpholine:

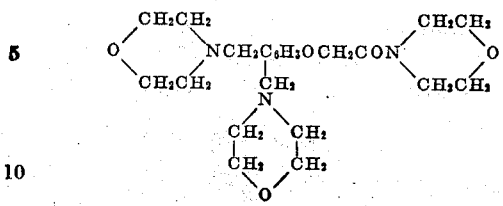

Quaternary salts may be formed therefrom by reaction with an alkylating or aralkylating agent as in previous examples.

Example 13

37 grams of chloromethyl phenoxy ethyl laurate, ClCH₂C₆H₄OC₂H₄OCOC₁₁H₂₃, was added to a cold mixture of 37 grams of aniline, 4 grams of sodium hydroxide, and 30 grams of water during ten minutes at −2° to 4° C. The viscous paste was diluted with 50 cc. of water and stirred 25 hours at 4–20° C. The oil layer was taken up with the aid of benzene, washed twice with water, and steam-distilled three hours. The residual oil layer was taken up in benzene, dried, and stripped in vacuo. A brown oil remained which crystallized on standing. This was anilinomethyl phenoxy ethyl laurate,

C₆H₅NHCH₂C₆H₄OC₂H₄OCOC₁₁H₂₃

Example 14

A mixture of 180 grams of phenoxy ethyl acetate, C₆H₅OC₂H₄OCOCH₃, 244 grams of 37% formaldehyde solution, and 200 grams of concentrated hydrochloric acid was stirred and saturated with hydrogen chloride for six and one-half hours at 30–40° C. The oil layer was taken up in benzene, washed with ice water, dried with anhydrous sodium sulfate, and filtered. 450 grams of a benzene solution of chloromethyl phenoxy ethyl acetate and dichloromethyl phenoxy ethyl acetate was obtained, and this was divided into two parts for the following experiments.

200 grams of a benzene solution of mono- and di-chloro-methyl phenoxy ethyl acetate was added to a cold mixture of 120 grams of water, 20 grams of sodium hydroxide, and 113 grams of dodecylamine at 10–11° C., and the mixture stirred 15 hours at 11–25° C. The oil layer was separated, washed twice with water, and steam-distilled. The residual oil layer was taken up in benzene, washed with water, dried with anhydrous sodium sulfate, and distilled in vacuo. The clear amber oil, boiling at 170–245° C./3 mm. was dodecylaminomethyl phenoxy ethyl acetate:

C₁₂H₂₅NHCH₂C₆H₄OC₂H₄OCOCH₃

Example 15

200 grams of the benzene solution of mono- and di-chloromethyl phenoxy ethyl acetate prepared in Example 14 was added to a cold mixture of 120 grams of water, 20 grams of sodium hydroxide, and 128 grams of 2-ethyl hexylamine, and the mixture stirred 15 hours at 15–25° C. The oil layer was separated, washed with water, and steam-distilled. The residual oil layer was taken up in benzene, washed, dried, filtered, and distilled. The clear amber oil boiling at 120–260° C./2 mm. was a mixture of 2-ethylhexylamino methyl phenoxy ethyl acetate

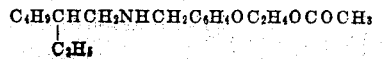

and di-(2-ethylhexylamino methyl) phenoxy ethyl acetate

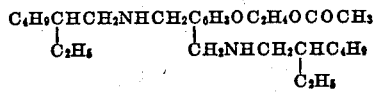

Example 16

A mixture of 177 grams of p-tert-octyl-phenoxy-ethoxy-ethoxy-ethyl dodecyl ether,

43 grams of 37% formaldehyde solution, and 200 grams of concentrated hydrochloric acid was stirred and saturated with hydrogen chloride for 19 hours at 40–60° C. The oil layer was separated, taken up in benzene, washed with ice water, and 850 grams of a milky emulsion was obtained which could not be salted out. This contained chloromethyl-p-tert-octyl phenoxy - ethoxy - ethoxy-ethyl dodecyl ether, and was divided into two parts for the following experiments.

382 grams of the emulsion thus prepared, containing chloromethyl p-tert-octyl phenoxy ethoxy-ethoxy-ethyl dodecyl ether,

was added to a cold mixture of 150 grams of water, 20 grams of sodium hydroxide, and 149 grams of cyclohexyl amine, and the mixture stirred 15 hours at 13–26° C. Then 20 cc. of 25% sodium hydroxide solution was added, and stirring was continued for five hours. The oil layer was separated and steam-distilled for three hours. The residual oil layer was taken up in benzene, washed, dried, and distilled in vacuo. The brown oil, boiling at 180–280° C./2 mm., was cyclohexylamino methyl p-tert-octyl phenoxy-ethoxy-ethoxy-ethyl dodecyl ether

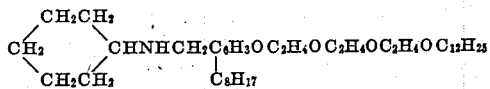

Example 17

382 grams of an emulsion prepared as in Example 16, containing about 21% of chloromethyl p-tert-octyl phenoxy-ethoxy-ethoxy-ethyl dodecyl ether,

was added to a cold mixture of 100 grams of water, 20 grams of sodium hydroxide, and 100 grams of monoisopropyl amine, and the mixture stirred 15 hours at 20–25° C. Then 20 cc. of 25% sodium hydroxide solution was added and stirring continued for five hours. The oil layer was separated, taken up in benzene, washed, dried, and distilled in vacuo. The clear red oil, boiling at 150–250° C./2 mm., was isopropylamino methyl p-tert-octyl phenoxy-ethoxy-ethoxy ethyl lauryl ether

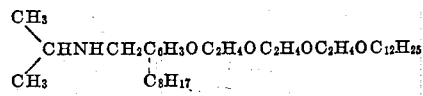

This amine is readily converted to the quaternary ammonium derivative by reacting it with an alkylating agent, such as benzyl chloride or bromide.

According to this invention compounds of the general formula

react with primary or secondary monoamines to form compounds of the formula $$(ZCH_2)_n ArXAY$$

wherein Z represents a nitrogenous group such as

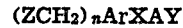

In these groups $a$ and $b$ are aliphatic, alicyclic, aralkyl, or aryl groups, $e$ is a saturated divalent group, and $d$ is an anion.

This application is a continuation-in-part of application Serial No. 445,452, filed June 2, 1942. It is particularly directed to aminoethyl ethers having as a terminal group represented by Y in the above general formulas an oxygenated polar group, such as hydroxyl, ether, ester, or ketone, as represented by the groupings —OH, —OR, —OCOR, —COOR, or —COR, wherein R represents an aliphatic, cycloaliphatic, arylaliphatic, aryl, or heterocyclic group, particularly a hydrocarbon group from one of the first four of these classes. The most common compounds have the groupings —OH, —O-alkyl, —O-aryl, —OCO-alkyl, —OCO-aryl, —COO-aryl, —COO-alkyl, —CO-alkyl, or —CO-aryl.

We claim:

1. A compound of the formula $$[(CH_3)_2NCH_2]_n\text{—phenyl } OC_2H_4OH$$

wherein $n$ is an integer having a value from one to two, inclusive.

2. A method of preparing aminomethyl aryl aliphatic ethers which comprises reacting between —20° C. and 250° C. in the presence of a strong base a monoamine having a reactive hydrogen atom on the amino nitrogen atom and being selected from a member of the class consisting of amines of the formulae

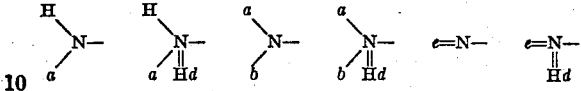

wherein $a$ and $b$ represent monovalent aliphatic, alicyclic, and aralkyl hydrocarbon groups and $e$ represents divalent saturated hydrocarbon and ether chains forming a heterocycle with the nitrogen, and an ether of the formula $$(Halogen\ CH_2)_n ArOAY$$

wherein $n$ is an integer having a value from one to two, inclusive, Ar is a carbocyclic aromatic group, A is a member of the class consisting of alkylene groups and alkylene groups the chain of which is interrupted by oxygen to form ether groups, and Y is an oxygen-containing polar group selected from —OH and —OR, while R represents alkyl and phenyl groups.

3. A method of preparing aminomethyl phenyl aliphatic ethers which comprises reacting between —20° C. and about 100° C. in the presence of a strong base a monoamine having a reactive hydrogen atom on the amino nitrogen atom thereof and being selected from a member of the class consisting of amines of the formulae

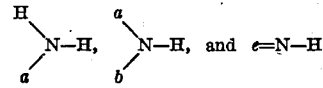

wherein $a$ and $b$ represent monovalent aliphatic, alicyclic, and aralkyl hydrocarbon groups and $e$ represents divalent saturated hydrocarbon and ether chains forming a heterocycle with the nitrogen, and an ether of the formula (Halogen CH₂)ₓ—phenyl—(OCH₂CH₂)ₘOH wherein m is a small integer and n is an integer having a value from one to two, inclusive.

4. A method of preparing aminomethyl phenyl aliphatic ethers which comprises reacting between —20° C. and about 100° C. in the presence of a strong base a monoamine having a reactive hydrogen atom on the amino nitrogen atom thereof and being selected from a member of the class consisting of amines of the formulae

wherein a and b represent monovalent aliphatic, alicyclic, and aralkyl hydrocarbon groups and e represents divalent saturated hydrocarbon and ether chains forming a heterocycle with the nitrogen, and an ether of the formula (Halogen CH₂)ₓ—phenyl—(OCH₂CH₂)ₘOR wherein n is an integer having a value from one to two, inclusive, m is a small integer, and R is an alkyl group of one to eighteen carbon atoms.

5. A compound of the formula (CH₃)₂CHNHCH₂C₆H₃OCH₂CH₂OCH₂CH₂OCH₂CH₂OC₁₂H₂₅
           |
           C₈H₁₇

6. Compounds of the formula (ZCH₂)ₓ—phenyl—(OCH₂CH₂)ₘOR wherein Z is a monoamine group selected from a member of the class consisting of

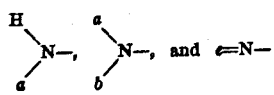

wherein a and b represent monovalent aliphatic, alicyclic, and aralkyl hydrocarbon groups and e represents divalent saturated hydrocarbon and ether chains forming a heterocycle with the nitrogen, n is an integer having a value from one to two, inclusive, m is an integer, and R is an alkyl group of one to eighteen carbon atoms.

7. Compounds of the formula (ZCH₂)ₓ—phenyl—(OCH₂CH₂)ₘOH wherein Z is a monoamine group selected from a member of the class consisting of

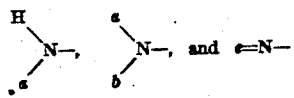

wherein a and b represent monovalent aliphatic, alicyclic, and aralkyl hydrocarbon groups and e represents divalent saturated hydrocarbon and ether chains forming a heterocycle with the nitrogen, n is an integer having a value from one to two, inclusive, and m is an integer.

8. Compounds of the formula (ZCH₂)ₓ—phenyl OAY wherein Z is a monoamine group selected from a member of the class consisting of

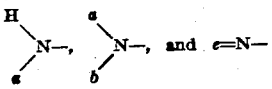

wherein a and b represent monovalent aliphatic, alicyclic, and aralkyl hydrocarbon groups and e represents divalent saturated hydrocarbon and ether chains forming a heterocycle with the nitrogen, n is an integer having a value from one to two, inclusive, A is a member of the class consisting of alkylene groups and alkylene groups the chain of which is interrupted by oxygen to form ether groups, and Y is an oxygen-containing polar group selected from a member of the class consisting of —OH and —OR, where R represents alkyl and phenyl groups.

CLINTON W. MacMULLEN.
HERMAN A. BRUSON.

REFERENCES CITED

The following references are of record in the file of this patent:

UNITED STATES PATENTS

| Number | Name | Date |
|---|---|---|
| 2,087,565 | Balle | July 20, 1937 |
| 2,260,967 | Bruson | Oct. 28, 1941 |
| 2,291,528 | Bruson | July 28, 1942 |